United States Patent
Kim

(10) Patent No.: US 11,212,738 B2
(45) Date of Patent: Dec. 28, 2021

(54) METHOD AND APPARATUS FOR TRANSMITTING OR RECEIVING DEREGISTRATION-RELATED MESSAGE IN WIRELESS COMMUNICATION SYSTEM

(71) Applicant: LG ELECTRONICS INC., Seoul (KR)

(72) Inventor: Laeyoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/754,728

(22) PCT Filed: Oct. 8, 2018

(86) PCT No.: PCT/KR2018/011823
§ 371 (c)(1),
(2) Date: Apr. 8, 2020

(87) PCT Pub. No.: WO2019/074250
PCT Pub. Date: Apr. 18, 2019

(65) Prior Publication Data
US 2020/0267634 A1 Aug. 20, 2020

Related U.S. Application Data

(60) Provisional application No. 62/570,066, filed on Oct. 9, 2017.

(30) Foreign Application Priority Data

Jul. 30, 2018 (KR) .................. 10-2018-0088469

(51) Int. Cl.
*H04W 48/16* (2009.01)
*H04W 76/11* (2018.01)
*H04W 8/08* (2009.01)
*H04W 60/06* (2009.01)
*H04W 84/04* (2009.01)

(52) U.S. Cl.
CPC ............. *H04W 48/16* (2013.01); *H04W 8/08* (2013.01); *H04W 60/06* (2013.01); *H04W 76/11* (2018.02); *H04W 84/042* (2013.01)

(58) Field of Classification Search
CPC ......... H04W 48/16; H04W 8/08; H04W 8/26; H04W 60/00; H04W 60/02; H04W 60/04;
(Continued)

(56) References Cited

U.S. PATENT DOCUMENTS

2018/0270781 A1* 9/2018 Baek et al. ........... H04W 60/06
2018/0368039 A1* 12/2018 Wu ....................... H04W 36/14
(Continued)

FOREIGN PATENT DOCUMENTS

WO 2018097599 5/2018

OTHER PUBLICATIONS

European Patent Office Application Serial No. 18866132.6, Search Report dated May 26, 2021, 14 pages.
(Continued)

*Primary Examiner* — Meless N Zewdu
(74) *Attorney, Agent, or Firm* — Lee Hong Degerman Kang Waimey

(57) ABSTRACT

An embodiment of the present invention relates to a method for transmitting or receiving a deregistration-related message to or from a user equipment (UE) by an access and mobility management function (AMF) in a wireless communication system, the method comprising the steps of: receiving a deregistration request message from a UE by a first AMF; and in response to the deregistration request message, transmitting a deregistration accept message to the UE by the first AMF, wherein the deregistration accept message includes a first 5G-globally unique temporary identifier (5G-GUTI) allocated by the first AMF.

11 Claims, 9 Drawing Sheets

(58) Field of Classification Search
CPC ..... H04W 60/06; H04W 76/11; H04W 76/00; H04W 76/02; H04W 76/30; H04W 76/32; H04W 76/34; H04W 84/042; H04W 24/04; H04W 12/75; H04W 12/40; H04W 12/30; H04W 12/08; H04W 12/082; H04W 12/00; H04W 8/18; H04W 8/20; H04W 88/00; H04W 88/08; H04W 88/18; H04W 92/00; H04W 92/02; H04W 92/08; H04W 92/10; H04W 92/14; H04W 92/24; H04W 48/04; H04W 8/02; H04W 74/08; G06F 2221/2117; G06F 2221/21; H04L 9/3268; H04L 9/3263; H04L 12/4679
See application file for complete search history.

(56) References Cited

U.S. PATENT DOCUMENTS

| | | | |
|---|---|---|---|
| 2019/0007500 A1* | 1/2019 | Kim et al. | H04L 67/141 |
| 2020/0059989 A1* | 2/2020 | Velev et al. | H04W 76/30 |

OTHER PUBLICATIONS

3rd Generation Partnership Project; Technical Specification Group Services and System Aspects; Procedures for the 5G System; Stage 2 (Release 15), 3GPP Ts 23.502 V1.2.0, Sep. 2017, 165 pages.
LG Electronics, "TS 23.501: Editorial update (NOTE numbering, non-breaking space. Style, etc.)", S2-176825, SA WG2 Meeting #122E e-meeting, Sep. 2017, 60 pages.

* cited by examiner

METHOD AND APPARATUS FOR TRANSMITTING OR RECEIVING DEREGISTRATION-RELATED MESSAGE IN WIRELESS COMMUNICATION SYSTEM

CROSS-REFERENCE TO RELATED APPLICATIONS

This application is the National Stage filing under 35 U.S.C. 371 of International Application No. PCT/KR2018/011823, filed on Oct. 8, 2018, which claims the benefit of U.S. Provisional Application No. 62/570,066, filed on Oct. 9, 2017, and also claims the benefit of earlier filing date and right of priority to Korean Application No. 10-2018-0088469, filed on Jul. 30, 2018, the contents of which are all hereby incorporated by reference herein in their entirety.

TECHNICAL FIELD

The present disclosure relates to a wireless communication system, and more particularly, to a method and apparatus for transmitting and receiving a deregistration-related signal in a $5^{th}$ generation system (5GS).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

DISCLOSURE

Technical Problem

An aspect of the present disclosure is to provide a method of efficiently performing an operation with a user equipment (UE), when an access and mobility management function (AMF) is not available. More particularly, an aspect of the present disclosure us to provide a method of transmitting and receiving a deregistration-related signal, when an AMF is not available.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of transmitting and receiving a deregistration-related message to and from a user equipment (UE) by an access and mobility management function (AMF) in a wireless communication system includes receiving a deregistration request message from the UE by a first AMF, and transmitting a deregistration accept message to the UE in response to the deregistration request message by the first AMF. The deregistration accept message includes a first $5^{th}$ generation-globally unique temporary identifier (5G-GUTI) allocated by the first AMF.

According to an embodiment of the present disclosure, an apparatus for a wireless communication system includes a memory and at least one processor coupled to the memory. The at least one processor is configured to receive a deregistration request message from a UE, and transmit a deregistration accept message to the UE in response to the deregistration request message. The deregistration accept message includes a first 5G-GUTI allocated by the apparatus.

According to an embodiment of the present disclosure, an apparatus for a wireless communication system includes a memory and at least one processor coupled to the memory. The at least one processor is configured to transmit a deregistration request message to a second AMF, and receive a deregistration accept message in response to the deregistration request message from a first AMF. The deregistration accept message includes a first 5G-GUTI allocated by the first AMF.

After a second AMF becomes unavailable in an idle state of the UE for both of a first access and a second access, the deregistration request message may be transmitted by the UE.

The deregistration request message may include a second 5G-GUTI allocated by the second AMF.

The deregistration request message may include information indicating for which access between the first access and the second access deregistration is.

The first 5G-GUTI may be used for both of the first access and the second access.

The first access and the second access may belong to the same public land mobile network (PLMN).

The first AMF may be selected by a network node which has received the deregistration request message.

The network node may be one of a next generation radio access network (NG-RAN) or a non-$3^{rd}$ generation partnership project (3GPP) interworking function (N3IWF).

The UE may have registered to a $5^{th}$ generation core network (5GC) through the first access and the second access.

The first access may be 3GPP access and the second access may be non-3GPP access, or the first access may be non-3GPP access and the second access may be 3GPP access.

Advantageous Effects

According to the present disclosure, how to allocate a $5^{th}$ generation-globally unique temporary identifier (5G-GUTI) to a user equipment (UE) is clearly defined, and when a non-access stratum (NAS) message is transmitted by an access which is not to be deregistered, a first 5G-GUTI is used. Therefore, the possibility of selecting an access and mobility management function (AMF) other than an already selected first AMF is blocked, thereby preventing the inefficiency of serving a UE by different AMFs. Further, when mobile termination (MT) data for a UE is generated, paging is performed by a first 5G-GUTI. Accordingly, ambiguity in this regard is also eliminated.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure.

BEST MODE

Figure 1:
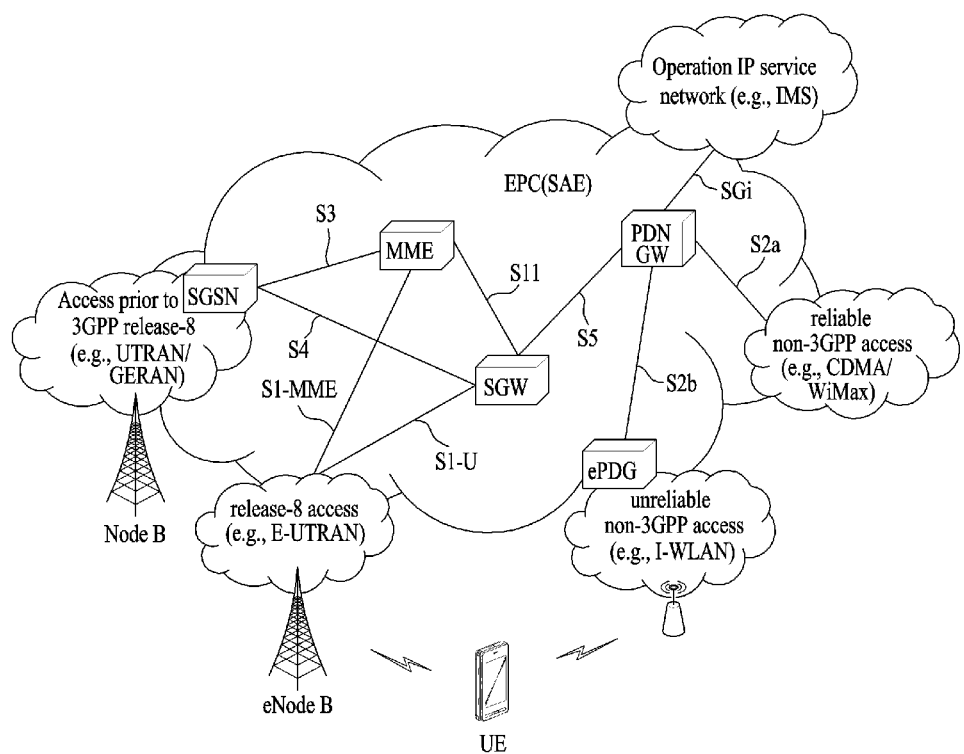
FIG. 1 is a schematic diagram illustrating the structure of an evolved packet system (EPS) including an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
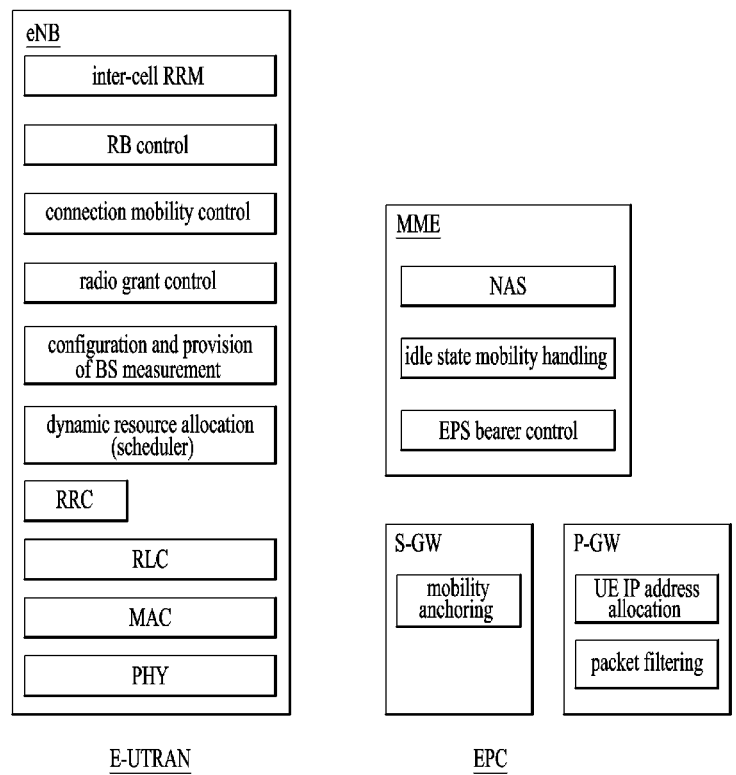
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
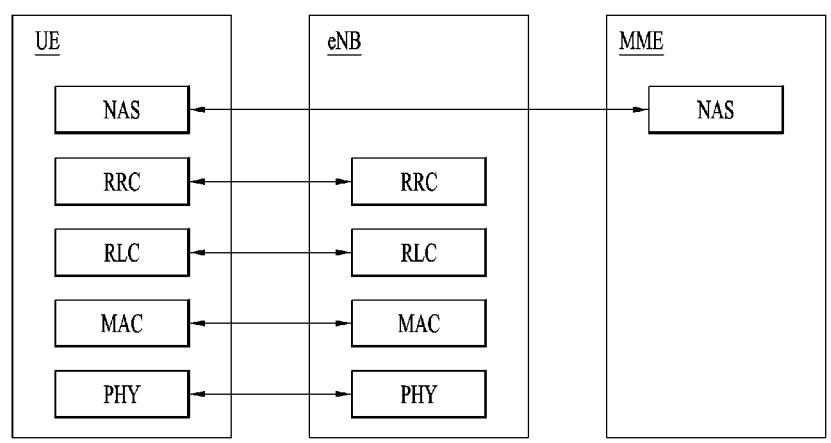
FIG. 3 is a diagram illustrating the structure of a radio interface protocol in a control plane.
Figure 4:
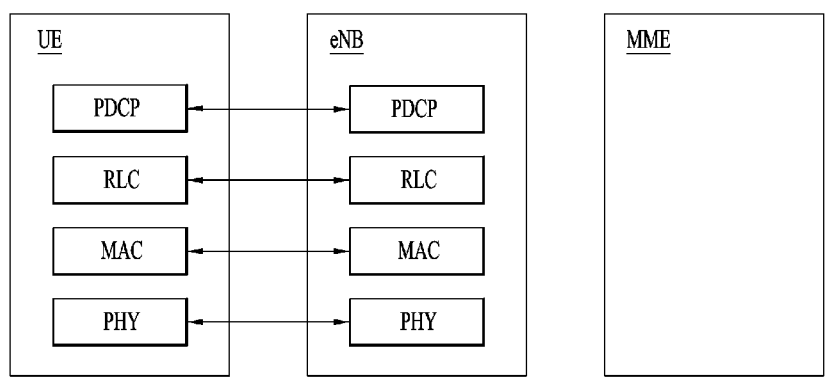
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
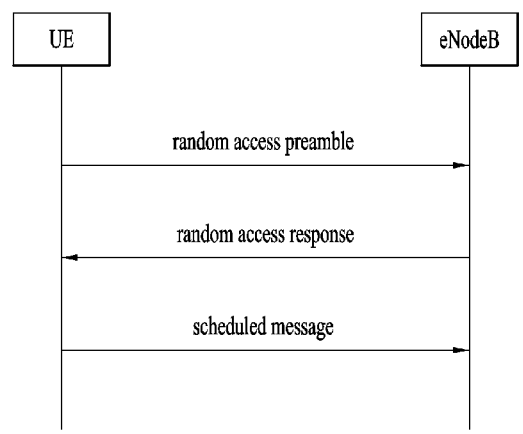
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
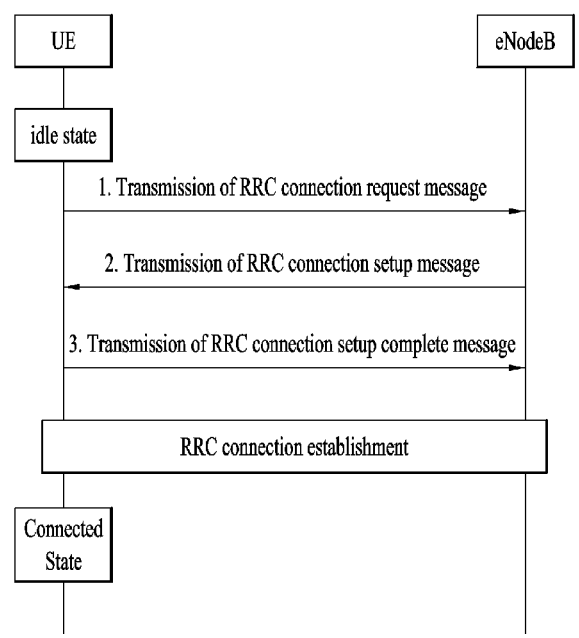
FIG. 6 is a diagram illustrating a connection process in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
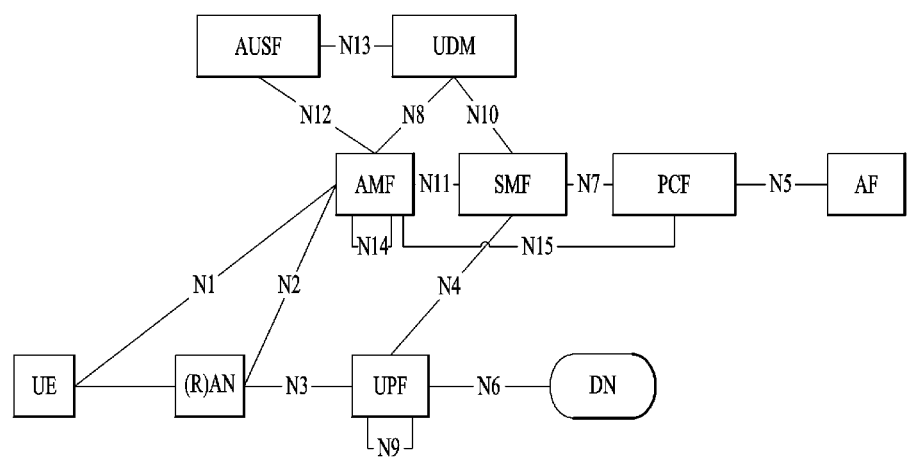
FIG. 7 is a diagram illustrating a $5^{th}$ generation (5G) system.

The functionality of the MME in the legacy EPC is decomposed into the access and mobility management function (AMF) and the session management function (SMF) in the next generation system (or 5G core network (CN)). The AMF carries out NAS interaction with a UE and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may have the configuration illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the policy and charging rules function (PCRF) of the EPC. Obviously, the functionalities may be extended to satisfy the requirements of the 5G system. For details of the architecture, functions, and interfaces of a 5G system, TS 23.501 is conformed to.

The 5G system is being worked on in TS 23.501, TS 23.502, and TS 23.503. Accordingly, the technical specifications are conformed to for the 5G system in the present disclosure. Further, TS 38.300 is conformed to for details of NG-RAN-related architecture and contents. As the 5G system also supports non-3GPP access, section 4.2.8 of TS 23.501 describes architecture and network elements for supporting non-3GPP access, and section 4.12 of TS 23.502 describes procedures for supporting non-3GPP access. A representative example of non-3GPP access is WLAN access, which may include both a trusted WLAN and an untrusted WLAN. The AMF of the 5G system performs registration management (RM) and connection management (CM) for non-3GPP access as well as 3GPP access.

Section 5.21.2 of TS 23.501v1.4.0 describes an operation/procedure for the case where an AMF is not available due to failure, which is incorporated as background art in the present disclosure. In an AMF management operation described in this document, when the serving AMF of a UE becomes unavailable in an idle (i.e., CM-IDLE) state of the UE, the AMF is not changed for the UE. When the AMF is changed, a temporary ID, that is, a $5^{th}$ generation-globally unique temporary identifier (5G-GUTI) should be newly allocated to the UE. However, this is not performed for the idle-state UE. Then, when the UE is connected (i.e., CM-CONNECTED), a new AMF is selected as a serving AMF. (For reference, a NAS operation that may be performed when the UE transitions from idle mode to connected mode is a registration procedure, a service request procedure, and a de-registration procedure for 3GPP access, and a service request procedure and a de-registration procedure for non-3GPP access). However, this method may cause the following problems in relation to 5G-GUTI allocation and selection of different AMFs.

When the UE has registered to a $5^{th}$ generation core network (5GC) through 3GPP access and non-3GPP access, and these two accesses belong to the same public land mobile network (PLMN), the UE is idle for both of the accesses, and the serving AMF of this UE becomes unavailable. In this case, the AMF informs 5G access networks (ANs) that it is not available. Subsequently, the UE transmits a Deregistration Request message to the AMF to deregister from a first access. Then, a 5G-AN of the first access selects a new AMF and transmits the NAS message transmitted by the UE to the new AMF. The new AMF processes the deregistration request for the first access of the UE and transmits a Deregistration Accept message to the UE. Further, the new AMF becomes a serving AMF for a second access of the UE. Whether the new AMF allocates/provides a new 5G-GUTI to the UE for an operation of the second access in the future and/or, if a new 5G-GUTI is allocated/provided, how the new 5G-GUTI is allocated/provided is not clearly defined in the related art. Particularly, if the UE has already been deregistered for the first access, the AMF does not transmit a NAS message to the UE through this access. Further, when the second access for which registration is maintained is non-3GPP access and is in an idle state, the AMF may not transmit a NAS message to the UE through the second access. Therefore, even though a new 5G-GUTI is allocated, it is not clear how to provide the new 5G-GUTI to the UE.

Further, the UE may transition to connected mode for the second access and transmit a NAS message to the AMF. Herein, the UE has no choice but to transmit the NAS message using the 5G-GUTI received from the old AMF, that is, the AMF which becomes unavailable, instead of the new AMF. Upon receipt of the NAS message, a 5G-AN of the second access may select a new AMF because the AMF indicated by the 5G-GUTI is not available. The selected AMF may be different from the AMF that has already served the second access.

When mobile terminated (MT) data for the UE is generated in the idle state of the UE on the second access (e.g., 3GPP access) after the UE performs deregistration for the first access (e.g., non-3GPP access), the new AMF should perform paging. This paging is performed based on the 5G-GUTI allocated to the UE (more precisely, a 5G-S-temporary mobile subscription identifier (5G-S-TMSI) which is a part of this value). In this case, it is unclear whether the new 5G-GUTI has been allocated to the UE as described above. It is not clear which 5G-GUTI value the paging is based on.

In another example, when the UE has registered to a 5GC through 3GPP access and non-3GPP access, and both of the accesses belong to the same PLMN, the UE is idle for both of the accesses. Then, the serving AMF of the UE becomes unavailable. In this case, the AMF informs 5G ANs that it is not available. Thereafter, the UE transitions to the connected mode for the first access and transmits a NAS message to the AMF. A 5G-AN of the first access selects a new AMF and transmits the NAS message transmitted by the UE to the new AMF. As the new AMF is allocated, a 5G-GUTI will be allocated to the UE. However, the UE may transition to connected mode for the second access and transmit a NAS message to the AMF, while the 5G-GUTI is not provided to the UE from the new AMF. The UE transmits the NAS message using a 5G-GUTI received from the old AMF. Upon receipt of the NAS message, a 5G-AN of the second access may select a new AMF because the AMF indicated by the 5G-GUTI is not available. Because the 5G-AN of the second access does not know that the 5G-AN of the first access has already selected a new AMF, the 5G-AN of the second access is likely to select an AMF other than the new AMF. The newly selected AMF will also allocate a 5G-GUTI to the UE. As such, the two AMFs serve the UE in the same PLMN, which is inefficient.

In this context, a description will be given of a method of efficiently processing an operation with a UE, when an AMF becomes unavailable in a 5G system (a 5G mobile communication system or a next-generation mobile communication system).

Embodiment 1

The first embodiment provides a method of solving the above-described problem by a deregistration procedure.

According to the first embodiment of the present disclosure, a first AMF may receive a Deregistration Request message from a UE and transmit a Deregistration Accept message to the UE in response to the Deregistration Request message. The Deregistration Accept message includes a first 5G-GUTI allocated by the first AMF.

The UE may transmit the Deregistration Request message, after a second AMF (i.e., the serving AMF of the UE before deregistration) becomes unavailable in an idle state of the UE for both of first access and second access (or for one access, if only the one access is registered) (i.e., in an idle state of the UE for all of registered accesses). That is, after the serving AMF (the second AMF) of the UE becomes unavailable while the UE is idle, the Deregistration Request message may be transmitted. The idle state means that when the UE has registered to a 5GC through specific access, the UE is in the idle state for the specific access, and when the UE has registered to a 5GC of the same PLMN for both 3GPP access and non-3GPP access, the UE is in the idle state for these two accesses. The first access and the second access may belong to the same PLMN. The first access may be 3GPP access, and the second access may be non-3GPP access. Alternatively, the first access may be non-3GPP access, and the second access may be 3GPP access.

The Deregistration Request message includes a second 5G-GUTI allocated by the second AMF (which is unavailable). Further, the Deregistration Request message includes information indicating which one of the first access and the second access is to be deregistered. That is, information indicating an access to be deregistered (e.g., an access type or the like) is included in the Deregistration Request message. The deregistration procedure is performed in conformance to section 4.2.2.3.2 (UE-initiated Deregistration) and section 4.12.3 (Deregistration procedure for untrusted non-3gpp access) of TS 23.502. Therefore, for contents which are not described in the present disclosure, TS 23.502 may be referred to.

The first AMF is an AMF selected by a network node (NG-RAN, N3IWF, or the like) which has received the Deregistration Request message (prior to the first AMF). That is, upon receipt of the Deregistration Request message, the NG-RAN or N3IWF selects a new AMF (the first AMF) for the UE, and transmits the Deregistration Request message to the first AMF. When the UE has registered to a 5GC of the same PLMN for both 3GPP access and non-3GPP access, the AMF becomes a serving AMF for the second access to which the UE keeps registered. This may include an operation of storing a UE context for the second access by the AMF. On the other hand, when the UE has registered to the 5GC of this PLMN for only one access, the AMF is no longer a serving AMF due to deregistration.

As described before, the new selected AMF (the first AMF) allocates a 5G-GUTI. This operation may be always performed, and the 5G-GUTI may be allocated and provided only when the UE deregisters from only one of the two accesses and is kept registered to the other access. In addition, the 5G-GUTI allocation may be performed when the access to which registration is continuously maintained and the access to be deregistered belong to the same PLMN (or EPLMN). The AMF may allocate the 5G-GUTI as described above, only when a deregistration type set in the Deregistration Request message transmitted by the UE is not switch-off.

The first AMF may include the newly allocated first 5G-GUTI in the Deregistration Accept message and provide it to the UE as described above. In another method, the first AMF may provide information indicating that the 5G-GUTI is changed in the Deregistration Accept message.

In the former case, the first AMF transmits a Deregistration Accept message including the first 5G-GUTI to the UE. Information about an access type for which the first 5G-GUTI is to be used may also be included in the Deregistration Accept message. If the UE has initially registered to a 5GC through two accesses belonging to the same PLMN (or EPLMN), the information about the access type may indicate both of the accesses, or only the access type to which registration is continuously maintained. If the UE has initially registered to the 5GC through one access, the information about the access type may indicate this access type. When the newly allocated 5G-GUTI is included in the Deregistration Accept message, the UE may transmit a message for providing acknowledgment (ack) to the AMF, for example, a NAS message such as Deregistration Accept Complete to the AMF.

In the latter case, the first AMF transmits a Deregistration Accept message to the UE. When a 5G-GUTI is allocated, the Deregistration Accept message includes information indicating that the 5G-GUTI is changed (or information indicating that a 5G-GUTI is newly allocated). The above information may be included only when the access to be deregistered is non-3GPP access, that is, the access to which registration is continuously maintained is 3GPP access. This is because when the first AMF provides the 5G-GUTI to the UE, a network-initiated operation may not be performed when the UE is idle on non-3GPP access. However, when the access to which registration is continuously maintained is non-3GPP access and the UE is in the idle state for the non-3GPP access, if it is possible to perform the following procedure of providing a 5G-GUTI through 3GPP access (even though the UE has deregistered from this access), the above information may be included without the above constraint.

Upon receipt of the Deregistration Accept message including the information, the UE may perform one or more of the following operations A) and B) based on the information. A) The UE does not transmit a NAS message through the second access until the UE receives a 5G-GUTI from the AMF. The NAS message may be interpreted as a NAS request message or a NAS operation initiated by the UE. B) The UE does not transmit a message to the network through the second access using the current 5G-GUTI until receiving a 5G-GUTI from the AMF. The network may refer to both a 5G-AN and a core network. The message transmitted to the network may be interpreted as a request message or an RRC or NAS operation initiated by the UE.

Thereafter, the AMF performs the procedure of providing a 5G-GUTI to the UE. For this purpose, a legacy procedure, for example, a UE Configuration Update procedure described in section 4.2.4.2 of TS 23.502, or a newly defined procedure may be used. When a 5G-GUTI is provided to the UE, information about an access type for which the 5G-GUTI is to be used may also be provided. For the information about the access type, refer to the above description.

The first 5G-GUTI allocated to the UE in this manner may be used for both the first access and the second access. That is, the UE uses the newly allocated 5G-GUTI. In the case where the UE has registered to the 5GC through the two accesses, when the UE deregisters from one access and transmits a message including a NAS message to the network through the non-deregistered access, the UE uses the newly allocated 5G-GUTI. Alternatively, in the case where the UE has registered to the 5GC through one access, when the UE deregisters from the 5GC and then registers to the 5GC again, the UE uses the newly allocated 5G-GUTI. Further, when the AMF needs to page the UE, the AMF performs paging based on the newly allocated 5G-GUTI.

As described above, as the first AMF newly selected in the deregistration procedure allocates the first 5G-GUTI to the UE by the Deregistration Accept message, how to allocate a 5G-GUTI to a UE is clearly defined. Since the first 5G-GUTI is used in transmitting a NAS message through an access which is not to be deregistered, the possibility of selecting an AMF other than the already selected first AMF is blocked, thereby preventing the inefficiency of serving the UE by different AMFs. Further, when MT data for the UE is generated, paging has only to be performed through the first 5G-GUTI. Therefore, ambiguity in this regard is also eliminated.

When the UE has transitioned from the idle mode to the connected mode through the access for which the Deregistration Request message has not been transmitted and which has not been deregistered from, before receiving the Deregistration Accept message (hereinafter, the access for which the Deregistration Request message has been transmitted is referred to as a first access, and the access for which the NAS message has been transmitted is referred to as a second access), I) the UE may perform an operation of cancelling the NAS message transmitted through the second access as soon as receiving the Deregistration Accept message. Thus, the 5G-AN of the second access may not transmit the NAS message to the AMF or cancel the NAS message which has already been transmitted to the AMF. Alternatively, II) the UE may retransmit the NAS message, using the newly allocated 5G-GUTI. Thus, the 5G-AN of the second access transmits the NAS message based on the 5G-GUTI to the AMF which has allocated the 5G0GUTI. Additionally, the 5G-AN may not transmit the previously received NAS message to the AMF, or if the 5G-AN has already transmitted the previously received NAS message to the AM, the 5G-AN may cancel the NAS message. Alternatively, III) the new AMF selected by the 5G-AN of the first access retrieves a UE context from an unstructured data storage function (UDSF) and stores that the new AMF is a new AMF for the UE. Then, a new AMF selected by the 5G-AN of the second access recognizes that another AMF is serving the UE, attempting to retrieve the UE context from the UDSF, and transmits its received NAS message to the other serving AMF. Alternatively, IV) the new AMF selected by the 5G-AN of the first access informs all AMFs of the same AMF set to which the new AMF belongs that it is a new AMF for the UE. Then, the new AMF selected by the 5G-AN of the second access transmits its received NAS message to the already serving AMF.

Figure 8:
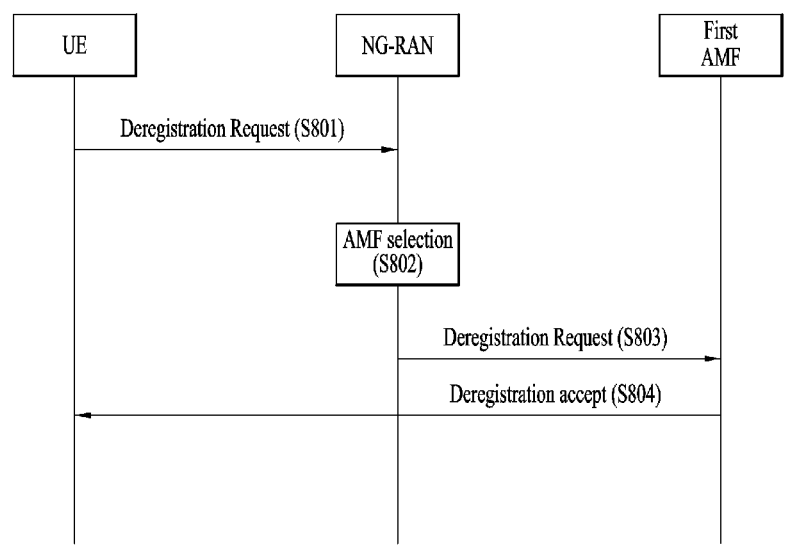
FIG. 8 is a diagram illustrating a method of transmitting and receiving a deregistration-related message according to an embodiment of the present disclosure.

FIG. 8 is a flowchart according to an embodiment of the present disclosure. Referring to FIG. 8, a first AMF may receive a Deregistration Request message from a UE (S803). For details, refer to the foregoing description of reception of a Deregistration Request message. The Deregistration Request message may be transmitted to an NG-RAN by the UE (S801), and the NG-RAN may select the AMF (S802) and then transmit the Deregistration Request message to the AMF. For details, refer to the forgoing related description. The first AMF may allocate a first 5G-GUTI to the UE and transmit a Deregistration Accept message including the first 5G-GUTI (S804). For details, refer to the forgoing related description.

While the above description is centered on an operation of an AMF, the same thing may be applied from the perspective of a UE operation. Specifically, the UE may transmit a Deregistration Request message to a second AMF and receive a Deregistration Accept message from a first AMF in response to the Deregistration Request message. The Deregistration Accept message may include a first 5G-GUTI allocated by the first AMF. In relation to this operation, the foregoing descriptions may be applied.

Embodiment 2

The second embodiment of the present disclosure is described in the aspect of an operation of a new AMF regarding deregistration. For the convenience of description, the following description is given stepwise.

Step 1) While a UE is idle, the serving AMF of the UE becomes unavailable. The idle state may be interpreted as idle for one access, when the UE has registered a 5GC through the one access, and as idle for both 3GPP access and non-3GPP access, when the UE has registered to a 5GC of the same PLMN for both 3GPP access and non-3GPP access.

Step 2) The UE transmits a Deregistration Request message to the AMF to deregister from a first access. Herein, the UE uses a 5G-GUTI allocated by the unavailable AMR The UE includes information indicating an access to be deregistered. For the deregistration procedure, section 4.2.2.3.2 (UE-initiated Deregistration) and section 4.12.3 (Deregistration procedure for entrusted non-3gpp access) of TS 23.502 are conformed to.

Step 3) An NG-RAN or N3IWF, which has received the Deregistration Request message, selects a new AMF for the UE and transmits the Deregistration Request message to this AMF. When the UE has registered for a 5GC of the same PLMN for both 3GPP access and non-3GPP access, the AMF becomes a serving AMF for the second access for which registration is continuously maintained. This may include an operation of storing a UE context for the second access by the AMF. On the other hand, when the UE has registered for the 5GC of this PLMN for only one access, the AMF is no longer the serving AMF due to the deregistration.

Step 4) The AMF (i.e., new AMF) does not allocate a 5G-GUTI. This may be interpreted as deferring 5G-GUTI allocation. This may be interpreted as using the 5G-GUTI (or old 5G-GUTI) allocated by the old AMF, that is, the unavailable AMF, or regarding the old 5G-GUTI as valid. This may be interpreted as allocating a new 5G-GUTI but not providing the new 5G-GUTI, or delaying the providing of the new 5G-GUTI to the UE. This may be interpreted as allocating a new 5G-GUTI, but only storing the new 5G-GUTI.

Step 5) When there is an access to which registration is maintained for the UE, that is, a second access, a NAS message may be transmitted through the second access. Herein, the UE transmits the NAS message using the 5G-GUTI allocated by the old AMF, that is, the unavailable AMF.

Step 6) A 5G-AN of the second access selects a new AMF because the AMF indicated by this 5G-GUTI is not available. Then, the 5G-AN transmits the NAS message transmitted by the UE to the new selected AMF.

Step 7) When the AMF selected in step 6) (referred to as AMF-B) is different from the AMF selected in step 3) (referred to as AMF-A), the AMF-B already knows that another AMF is serving the UE, and redirects the NAS message (N2 message including the NAS message) to the AMF-A.

Step 8) The AMF-A allocates a 5G-GUTI (when the 5G-GUTI has been allocated in step 4) but not provided to the UE, the allocation operation is skipped). The AMF performs a procedure of providing the 5G-GUTI to the UE. For this purpose, the legacy procedure, for example, a UE Configuration Update procedure described in section 4.14.2 of TS 23.502, or a newly defined procedure may be used. When the received NAS message is a Registration Request message, the 5G-GUTI may be included in a Registration Accept message and provided. When the 5G-GUTI is provided to the UE, information about an access type for which the 5G-GUTI is to be used, that is, information about the second access may be provided additionally.

Step 8) may be performed after, before, or simultaneously with processing of the NAS message received in step 7).

When the UE transmits the Registration Request message to the AMF (using the 5G-GUTI provided by the old AMF) for new registration in the absence of any access to which registration is maintained after the UE deregisters from the first access, or for registration to the first access in the state of registration to the second access, the 5G-AN selects a new AMF. When the AMF-A is selected, step 8) may be performed. In this case, a newly allocated 5G-GUTI may be provided to the UE by the Registration Accept message.

When an MT service needs to be processed for the UE before step 8), the AMF-A may provide the allocated 5G-GUTI to the UE after or simultaneously with processing of the MT service. Eventually, when a transaction (a UE-initiated transaction or a network-initiated transaction) occurs to the UE, the new AMF updates the 5G-GUTI for the UE.

The AMF-A processes a NAS message of the UE and pages the UE based on the old 5G-GUTI (which may a 5G-GUTI allocated by the old AMF) until before the 5G-GUTI allocated by the AMF-A is provided to the UE or becomes valid.

Table 2 below is a modification (underlined) to section 5.21.2 (AMF Management) of TS 23.501v15.2.0 based on Embodiment 2.

TABLE 2

5.21.2 AMF Management5.21.2.1 AMF Addition/UpdateThe 5G System should support establishment of association between AMF and 5G-AN node. A new AMF can be added to an AMF set and association between AMF and GUAMI can be created and/or updated as follows: - AMF shall be able to dynamically update the NRF with the new or updated GUAMI(s) to provide mapping between GUAMI(s) and AMF information. Association between GUAMI(s) and AMF is published to NRF. In addition, to deal with planned maintenance and failure, an AMF may optionally provide backup AMF information, i.e. it act as a backup AMF if the indicated GUAMI associated AMF is unavailable. Based on that information one GUAMI is associated with an AMF, optionally with a backup AMF used for planned removal and/or another (same or different) backup AMF used for failure. - Upon successful update, the NRF considers the new and/or updated GUAMI(s) for providing AMF discovery results to the requester. Requester can be other CP network functions. Information about new AMF should be published and available in the DNS system. It should allow 5G-AN to discover AMF and setup associations with the AMF required. N2 setup procedure should allow the possibility of AMFs within the AMF Set to advertise the same AMF Pointer and/or distinct AMF Pointer value(s) to the 5G-AN node. To support the legacy EPC core network entity (i.e. MME) to discover and communicate with the AMF, the information about the AMF should be published and available in the DNS system. Furthermore, GUMMEI and GUAMI encoding space should be partitioned to avoid overlapping values in order to enable MME discover an AMF without ambiguity.5.21.2.2 AMF planned removal procedure5.21.2.2.1 AMF planned removal procedure with UDSF deployedAn AMF can be taken graciously out of service as follows: - If an UDSF is deployed in the network, then the AMF stores the context for registered UE(s) in the UDSF. The UE context includes the AMF UE NGAP ID that is unique per AMF set. In order for the AMF planned removal procedure to work graciously, 5G-S-TMSI shall be unique per AMF Set. If there are ongoing transactions (e.g. N1 procedure) for certain UE(s), AMF stores the UE context(s) in the UDSF upon completion of an ongoing transaction. - The AMF deregister itself from NRF indicating due to AMF planned removal. NOTE 1: It is assumed that the UE contexts from the old AMF include all event subscriptions with peer CP NFs. NOTE 2: Before removal of AMF the overload control mechanism can be used to reduce the amount of ongoing transaction. An AMF identified by GUAMI(s) shall be able to notify the 5G-AN that it will be unavailable for processing transactions by including GUAMI(s) configured on this AMF. Upon receipt of the indication that an AMF(identified by GUAMI(s)) is unavailable, 5G-AN shall take the following action: - 5G-AN should mark this AMF as unavailable and not consider the AMF for selection for subsequent N2 transactions until 5G-AN learns that it is available (e.g. as part of discovery results or by configuration). - If 5G-AN indicated support of timer capability during NGAP Setup procedure, the AMF may include an additional indicator that the AMF will rebind or release the NGAP UE-TNEA-binding on a per UE-basis for UE(s) in CM-CONNECTED state. If that indicator is included and the 5G-AN supports timer mechanism, the 5G-AN starts a timer to control the release of NGAP UE-TNLA-binding. For the duration of the timer or until the AMF releases or re-binds the NGAP UE-TNLA-binding the AN does not select a new AMF for subsequent UE transactions. Upon timer expiry, the 5G-AN releases the NGAP UE UE-TNLA-binding(s) with the corresponding AMF for the respective UE(s), for subsequent N2 message, the 5G-AN should select a different AMF from the same AMF set when the subsequent N2 message needs to be sent. NOTE 3: For UE(s) in CM-CONNECTED state, after indicating that the AMF is unavailable for processing UE transactions and including an indicator that the AMF releases the NGAP UE-TNLA-binding(s) on a per UE-basis, the AMF can either trigger a re-binding of the NGAP UE associations to an available TNLA on a different AMF in the same AMF set or use the NGAP UE-TNLA-binding per UE release procedure defined in TS 23.502 [3] to release the NGAP UE-TNLA-binding on a per UE-basis while requesting the AN to maintain N3 (user plane connectivity) and UE context information. - If the instruction does not include the indicator, for UE(s) in CM-CONNECTED state, 5G-AN considers this as a request to release the NGAP UE-TNLA-binding with the corresponding AMF for the respective UE(s) while maintaining N3 (user plane connectivity) and UE context information. For subsequent N2 message, the 5G-AN should select a different AMF from the same AMF set when the TABLE 2-continued subsequent N2 message needs to be sent. - For UE(s) in CM-IDLE state, when it subsequently returns from CM-IDLE state and the 5G-AN receives an initial NAS message with a 5G S-TMSI or GUAMI pointing to an AMF that is marked unavailable, the 5G-AN should select a different AMF from the same AMF set and forward the initial NAS message. If the 5G-AN can't select an AMF from the same AMF set, the 5G-AN selects another new AMF as described in clause 6.3.5. If the NAS message is a Deregistration Request message, the newly selected AMF does not update the 5G- GUTI towards the UE. If one Access Type is deregistered and the newly selected AMF becomes a serving AMF for other Access Type than the deregistered Access Type, the AMF updates the 5G-GUTI later when there is a transaction with the UE for theother Access Type. An AMF identified by GUAMI(s) shall be able to instruct other peer CP NFs, subscribed to receive such a notification, that it will be unavailable for processing transactions by including GUAMI(s) configured on this AMF. If the CP NFs register with NRF for AMF unavailable notification, then the NRF shall be able to notify the subscribed NFs to receive such a notification that AMF identified by GUAMI(s) will be unavailable for processing transactions. Upon receipt of the notification that an AMF (GUAMI(s)) is unavailable, the other CP NFs shall take the following actions: - CP NF should mark this AMF (identified by GUAMI(s)) as unavailable and not consider the AMF for selection for subsequent MT transactions until the CP NF learns that it is available (e.g. as part of NF discovery results or via NF status notification from NRF). - Mark this AMF as unavailable while not changing the status of UE(s) associated to this AMF (UE(s) previously served by the corresponding AMF still remain registered in the network), and AMF Set information. - For the UE(s) that were associated to the corresponding AMF, when the peer CP NF needs to initiate a transaction towards the AMF that is marked unavailable, CP NF should select another AMF from the same AMF set (as in clause 6.3.5) and forward the transaction together with the old GUAMI. The new AMF retrieves UE context from the UDSF. If CP NF needs to send a notification to new AMF which is associated with a subscription from the old AMF, the CP NF shall exchange the old AMF information embedded in the Notification Address with the new AMF information, and use that Notification Address for subsequent communication. NOTE 4: If the CP NF does not subscribe to receive AMF unavailable notification (either directly from the AMF or via NRF), the CP NF may attempt forwarding the transaction towards the old AMF and detect that the AMF is unavailable after certain number of attempts. When it detects unavailable, it marks the AMF and its associated GUAMI(s) as unavailable. CP NF should select another AMF from the same AMF set (as in clause 6.3.5) and forward the transaction together with the old GUAMI. The new AMF retrieves UE context from the UDSF and process the transaction. Following actions should be performed by the newly selected AMF: - When there is a transaction with the UE the newly selected AMF retrieves the UE context from the UDSF based on SUPI, 5G-GUTI or AMF UE NGAP ID and processes the UE message accordingly and updates the 5G-GUTI towards the UE, if necessary. For UE(s) in CM-CONNECTED state, it may also update the NGAP UE association with a new AMF UE NGAP ID towards the 5G-AN. - When there is a transaction with the UE, the new selected AMF updates the peer NFs (that subscribed to receive AMF unavailability notification from old AMF), with the new selected AMF information. - If the new AMF is aware of a different AMF serving the UE (by implementation specific means) it redirects the uplink N2 signalling of the UE to that AMF if necessary, or reject the transaction from the peer CP NFs with a cause to indicate that new AMF has been selected. The peer CP NFs resend the transaction to the new AMF. NOTE 4: This bullet above addresses situations where 5G-AN node selects an AMF and CP NFs select another AMF for the UE concurrently. It also addresses the situation where CP NFs select an AMF for the UE concurrently- If the UE is in CM-IDLE state and the new AMF does not have access to the UE context, the new AMF selects one available AMF from the old AMF set as described in clause 6.3.5. The selected AMF retrieves the UE context from the UDSF and provides the UE context to the new AMF. If the new AMF doesn't receive the UE context then the AMF may force the UE to perform Initial Registration.5.21.2.2.2 AMF planned removal procedure without UDSFAn AMF can be taken graciously out of service as follows: - The AMF can forward registered UE contexts, UE contexts grouped by the same GUAMI value, to target AMF(s) within the same AMF set, including the source AMF name used for redirecting UE's MT transaction. The UE context includes the per AMF Set unique AMF UE NGAP ID. In order for the AMF planned removal procedure to work graciously, 5G-S-TMSI shall be unique per AMF set. If there are ongoing transactions (e.g. N1 procedure) for certain UE(s), AMF forwards the UE context(s) to the target AMF upon completion of an ongoing transaction. - The AMF deregister itself from NRF indicating due to AMF planned removal. NOTE 1: It is assumed that the UE contexts from the old AMF include all event subscriptions with peer CP NFs. NOTE 2: Before removal of AMF the overload control mechanism can be used to reduce the amount of ongoing transaction. An AMF shall be able to instruct the 5G-AN that it will be unavailable for processing transactions by including GUAMI(s) configured on this AMF and its corresponding target AMF(s). The target AMF shall be able to update the 5G-AN that the UE(s) served by the old GUAMI(s) are now served by target AMF. The target AMF provides the old GUAMI value that the 5G-AN can use to locate UE contexts served by the old AMF. Upon receipt of the indication that an old AMF is unavailable, 5G-AN shall take the following action: - 5G-AN should mark this AMF as unavailable and not consider the AMF for selection for subsequent N2 transactions until 5G-AN learns that it is available (e.g. as part of discovery results or by configuration). The associated GUAMIs are marked as unavailable. - If 5G-AN indicated support of timer capability during NGAP Setup, the AMF may include an additional indicator that the AMF will rebind or release the NGAP UE-TNLA-binding on per UE-basis. If that indicator is included and the 5G-AN supports timer mechanism, the 5G-AN starts a timer to control the release of NGAP UE-TNLA-binding(s). For the duration of the timer or until the AMF releases or re-binds the NGAP UE-TNLA-binding, the AN does not select a new AMF for subsequent transactions. Upon timer expiry, the 5G-AN releases the NGAP UE-TNLA- TABLE 2-continued binding(s) with the corresponding AMF for the respective UE(s), for subsequent N2 message, the 5G-AN uses GUAMI which points to the target AMF that replaced the old unavailable AMF, to forward the N2 message to the corresponding target AMF(s). NOTE 3: For UE(s) in CM-CONNECTED state, after indicating that the AMF is unavailable for processing UE transactions and including an indicator that the AMF releases the NGAP UE-TNLA-binding on a per UE-basis, the AMF can either trigger a re-binding of the NGAP UE associations to an available TNLA on a different AMF within the same AMF set or use the NGAP UE-TNLA-binding per UE release procedure defined in TS 23.502 [3] to release the NGAP UE-TNLA-binding on a per UE-basis while requesting the AN to maintain N3 (user plane connectivity) and UE context information. If the instruction does not include the indicator, for UE(s) in CM-CONNECTED state, 5G-AN considers this as a request to release the NGAP UE UE-TNLA-binding(s) with the corresponding AMF for the respective UE(s) while maintaining N3 (user plane connectivity) and UE context information. For subsequent N2 message, the 5G-AN uses GUAMI based resolution which points to the target AMF that replaced the old unavailable AMF, to forward the N2 message to the corresponding target AMF(s). - For UE(s) in CM-IDLE state, when it subsequently returns from CM-IDLE state and the 5G-AN receives an initial NAS message with a 5G S-TMSI or GUAMI, based resolution the 5G-AN uses 5G S-TMSI or GUAMI which points to the target AMF that has replaced the old unavailable AMF and, the 5G-AN forwards N2 message. If the NAS message is a Deregistration Request message, the target AMF does not update the 5G-GUTI towards the UE. If one Access Type is deregistered and the target AMF becomes a serving AMF for other Access Type than the deregistered Access Type, the AMF updates the 5G-GUTI later when there is a transaction with the UE for the other Access Type.
An AMF shall be able to instruct other peer CP NFs, subscribed to receive such a notification, that it will be unavailable for processing transactions by including GUAMI(s) configured on this AMF and
its corresponding target AMF(s). The target AMF shall update the CP NF that the old GUAMI(s) is now served by target AMF. The old AMF provides the old GUAMI value to target AMF and the target AMF can use to locate UE contexts served by the old AMF. If the CP NFs register with NRF for AMF unavailable notification, then the NRF shall be able to notify the subscribed NFs to receive such a notification (along with the corresponding target AMF(s)) that AMF identified by GUAMI(s) will be unavailable for processing transactions. Upon receipt of the notification that an AMF is unavailable, the other CP NFs shall take the following action: - Mark this AMF and its associated GUAMI(s) as unavailable while not changing the status of UE(s) associated to this AMF (UE(s) previously served by the corresponding AMF still remain registered in the network), and AMF Set information. - For the UE(s) that were associated to the corresponding AMF, when the peer CP NF needs to initiate a transaction towards the AMF that is marked unavailable and the old unavailable AMF was replaced by the target AMF, CP NF should forward the transaction together with the old GUAMI to the target AMF(s). If CP NF needs to send a notification to new AMF which is associated with a subscription from the old AMF, the CP NF shall exchange the old AMF information embedded in the Notification Address with the new AMF information, and use that Notification Address for subsequent communication. NOTE 4: If the CP NF does not subscribe to receive AMF unavailable notification (either directly with the AMF or via NRF), the CP NF may attempt forwarding the transaction towards the old AMF and detect that the AMF is unavailable after certain number of attempts. When it detects unavailable, it marks the AMF and its associated GUAMI(s) as unavailable. The following actions should be performed by the target AMF: - To allow AMF process ongoing transactions for some UE(s) even after it notifies unavailable status to the target AMF, the target AMF keeps the association of the old GUAMI(s) and the old AMF for a configured time. During that configured period, if target AMF receives the transaction from the peer CP NFs and cannot locate UE context, it rejects the transaction with old AMF name based on that association, and the indicated AMF is only used for the ongoing transaction. The peer CP NFs resend the transaction to the indicated AMF only for the ongoing transaction. For subsequent transactions, peer CP NFs should use the target AMF. When the timer is expired, the target AMF deletes that association information. - When there is a transaction with the UE the target AMF uses SUPI, 5G-GUTI or AMF UE NGAP ID to locate UE contexts and processes the UE transactions accordingly and updates the 5G-GUTI towards the UE, if necessary. For UE(s) in CM-CONNECTED state, it may also update the NGAP UE association with a new AMF UE NGAP ID towards the 5G-AN. - Target AMF shall not use old GUAMI to allocate 5G-GUTI for UE(s) that are being served by Target AMF.5.21.2.3 Procedure for AMF Auto-recovery In order to try and handle AMF failure in a graceful manner (i.e. without impacting the UE), AMF can either back up the UE contexts in UDSF, or per GUAMI granularity in other AMFs (serving as backup AMF for the indicated GUAMI). NOTE 1: Frequency of backup is left to implementation. For deployments without UDSF, for each GUAMI the backup AMF information (in association to the GUAMI) is configured in the AMF. The AMF sends this information to 5G-AN and other CP NFs during the N2 setup procedure or the first (per NF) interaction with other CP NFs. In the case that an AMF fails and the 5G-AN/peer CP NFs detect that the AMF has failed, or the 5G-AN/peer CP NFs receives notification from another AMF in the same AMF set that this AMF has failed, following actions are taken: - The OAM deregister the AMF from NRF indicating due to AMF failure. - 5G-AN marks this AMF as failed and not consider the AMF for selection until explicitly notified. - For UE(s) in CM-CONNECTED state, 5G-AN considers failure detection or failure notification as a trigger to release the NGAP UE-TNLA-binding(s) with the corresponding AMF for the respective UE(s) while maintaining N3 (user plane connectivity) and other UE context information. For subsequent N2 message, if the backup AMF information of the corresponding failed AMF is not available the 5G-AN should select a different AMF (as in clause 6.3.5) from the same AMF set when the subsequent N2 message needs to be sent for the UE(s). If no other AMF from the AMF set is available, then it can select an AMF from TABLE 2-continued the same AMF Region as in clause 6.3.5. If backup AMF information of the corresponding failed AMF is available, the 5G-AN forwards the N2 message to the backup AMF. NOTE 2: One AMF in the AMF set may be configured to send this failure notification message.- For UE(s) in CM-IDLE state, when it subsequently returns from CM-IDLE state and the 5G-AN receives an initial NAS message with a S-TMSI or GUAMI pointing to an AMF that is marked failed, if the backup AMF information of the corresponding failed AMF is not available the 5G-AN should select a different AMF from the same AMF set and forward the initial NAS message. If no other AMF from the AMF set is available, then it can select an AMF from the same AMF Region as in clause 6.3.5. If backup AMF information of the corresponding failed AMF is available, the 5G-AN forwards the N2 message to the backup AMF. If the NAS message is a Deregistration Request message, the new AMF does not update the 5G-GUTI towards the UE. If one Access Type is deregistered and the new AMF becomes a serving AMF for other Access Type than the deregistered Access Type, the AMF updates the 5G-GUTI later when there is a transaction with the UE for the other Access Type. -
Peer CP NFs consider this AMF as unavailable while retaining the UE context. - For the UE(s) that were associated to the corresponding AMF, when the peer CP NF needs to initiate a transaction towards the AMF, if backup AMF information of the corresponding failed AMF is not available, CP NF should select another AMF from the same AMF set and forward the transaction together with the old GUAMI. If backup AMF information of the corresponding failed AMF is available, the CP NF forwards transaction to the backup AMF. If CP NF needs to send a notification to new AMF which is associated with a subscription from the old AMF, the CP NF shall exchange the old AMF information embedded in the Notification Address with the new AMF information, and use that Notification Address for subsequent communication. - When the 5G-AN or CP NFs need to select a different AMF from the same AMF set, - For deployments with UDSF, any AMF from the same AMF set can be selected. - For deployments without UDSF, the backup AMF is determined based on the GUAMI of the failed AMF. Following actions should be taken by the newly selected AMF: - For deployments with UDSF, when there is a transaction with the UE the newly selected AMF retrieves the UE context from the UDSF using SUPI, 5G-GUTI or AMF UE NGAP ID and it processes the UE message accordingly and updates the 5G-GUTI towards the UE, if necessary. - For deployments without UDSF, backup AMF (the newly selected AMF), based on the failure detection of the old AMF, instructs peer CP NFs and 5G-AN that the UE contexts corresponding to the GUAMI of the failed AMF is now served by this newly selected AMF. The backup AMF shall not use old GUAMI to allocate 5G-GUTI for UE(s) that are being served by Target AMF. The backup AMF uses the GUAMI to locate the respective UE Context(s). - When there is a transaction with the UE, the new AMF updates the peer NFs (that subscribed to receive AMF unavailability notification from old AMF) with the new AMF information. - If the new AMF is aware of a different AMF serving the UE (by implementation specific means) it redirects the uplink N2 signalling to that AMF, or reject the transaction from the peer CP NFs with a cause to indicate that new AMF has been selected. The peer CP NFs may wait for the update from the new AMF and resend the transaction to the new AMF. NOTE 3: This bullet above addresses situations where 5G-AN node selects an AMF and other CP NFs select an AMF for the UE concurrently. It also addresses the situation where CP NFs select an AMF for the UE concurrently. NOTE 4: It is assumed that the UE contexts from the old AMF include all event subscriptions with peer CP NFs. - If the UE is in CM-IDLE state and the new AMF does not have access to the UE context, the new AMF selects one available AMF from the old AMF set as described in clause 6.3.5. The selected AMF retrieves the UE context from the UDSF and provides the UE context to the new AMF. If the new AMF doesn't receive the UE context then the AMF may force the UE to perform Initial Registration. NOTE 5: The above N2 TNL association selection and AMF management is applied to the selected PLMN.

Embodiment 3

The third embodiment of the present disclosure centers on an operation of a new AMF, particularly a Service Request-related operation.

Step 1) While the UE is idle, the serving AMF of the UE becomes unavailable. The idle state may be interpreted as idle for one access, when the UE has registered a 5GC through the one access, and as idle for both 3GPP access and non-3GPP access, when the UE has registered to a 5GC of the same PLMN for both 3GPP access and non-3GPP access.

Step 2) The UE transmits a Service Request message to the AMF through a first access. Herein, the UE uses a 5G-GUTI allocated by the unavailable AMF. For a service request procedure, section 4.2.3.2 (UE triggered Service Request in CM-IDLE state) and section 4.12.4.1 (Service Request procedures via Untrusted non-3GPP Access) of TS 23.502 are conformed to.

Step 3) An NG-RAN or N3IWF (which may be referred to as a 5G-AN), which has received the Service Request message, selects a new AMF for the UE and transmits the Service Request message to this AMF.

Then, either of the following method #1) or method #2) may be performed.

Method #1)

Step 4-1) The AMF (i.e., new AMF) allocates a 5G-GUTI.

Step 5-1) The AMF provides a Service Accept message including the 5G-GUTI to the UE. Information about an access type for which the 5G-GUTI is to be used may further be included in the Service Accept message. When the UE has initially registered to a 5GC through two accesses belonging to the same PLMN (or EPLMN), the information about the access type may indicate both accesses. When the UE has initially registered to the 5GC through one access, the information about the access type may indicate this access type.

6-1) The UE transmits a message for providing ack to the AMF for the newly allocated 5G-GUTI, for example, a NAS message such as Service Accept Complete to the AMF.

Method #2)

Step 4-2) The AMF (i.e., new AMF) allocates a 5G-GUTI.

Step 5-2) The AMF includes information indicating that the 5G-GUTI is changed (or information indicating that a 5G-GUTI is newly allocated) in a Service Accept message transmitted to the UE. The AMF may include the information all the time, or only when the UE has also been registered to the second access (in this case, the UE has registered to the 5GC of the same PLMN through the two accesses) and idle for the second access.

Upon receipt of the Service Accept message, the UE may perform one or more of the following operations based on the information.

a) The UE does not transmit a NAS message through the first access until the UE receives the 5G-GUTI from the AMF.

b) The UE does not transmit a NAS message through the second access until the UE receives the 5G-GUTI from the AMF.

c) The UE does not transmit a message to the network through the first access using the current 5G-GUTI until the UE receives the 5G-GUTI from the AMF. The network may refer to both of a 5G-AN and a core network.

d) The UE does not transmit a message to the network through the second access using the current 5G-GUTI until the UE receives the 5G-GUTI from the AMF. The network may refer to both of a 5G-AN and a core network.

In a) and b), the NAS message may be interpreted as a NAS request message or a UE-initiated NAS operation.

In c) and d), the message transmitted to the network may be interpreted as a request message or a UE-initiated RRC or NAS operation.

Step 6-2) The AMF performs a procedure of providing the 5G-GUTI to the UE. For this purpose, for example, the UE Configuration Update procedure described in section 4.2.4.2 of TS 23.502, or a newly defined procedure may be used. When the 5G-GUTI is provided to the UE, information about an access type for which the 5G-GUTI is to be used may further be provided. For information on an access type, refer to the description of step 5) in method #1).

Step 4) may be performed after step 5).

In method #1) and method #2), when the UE transmits another NAS message to the AMF through the first access before receiving the Service Accept message, the 5G-AN may transmit the NAS message to the already selected AMF (in step 3), although the 5G-AN has received the old 5G-GUTI from the UE.

When the UE transitions from the idle mode to the connected mode through the second access and transmits a NAS message to the AMF before receiving the Service Accept message, a UE-based solution of i) or ii) or a network-based solution of iii) or iv) may be performed.

i) Upon receipt of the Service Accept message, the UE may perform an operation of canceling the NAS message transmitted through the second access. Thus, the 5G-AN of the second access may not transmit the NAS message to the AMF, or cancel the NAS message When the 5G-AN has already transmitted the NAS message. Alternatively, ii) the UE may retransmit the NAS message using the newly allocated 5G-GUTI. Thus, the 5G-AN of the second access transmits the NAS message based on the 5G-GUTI to the AMF which has allocated the 5G-GUTI. In addition, the 5G-AN of the second access may not transmit the previously received NAS message to the AMF, or cancel the NAS message when the 5G-AN has already transmitted the NAS message. Alternatively, iii) the new AMF selected by the 5G-AN of the first access retrieves a UE context from a UDSF and stores the UE context with itself set as a new AMF for the UE. Then, the new AMF selected by the 5G-AN of the second access recognizes that another AMF is serving the UE, attempting to retrieve the UE context from the UDSF, and transmits its received NAS message to the other serving AMF. Alternatively, iv) the new AMF selected by the 5G-AN of the first access informs all AMFs of the same AMF set to which the new AMF belongs that it is a new AMF for the UE. Then, the new AMF selected by the 5G-AN of the second access transmits its received NAS message to the already serving AMF.

Embodiment 4

Step 1) While the UE is idle, the serving AMF of the UE becomes unavailable. The idle state may be interpreted as idle for one access, when the UE has registered a 5GC through the one access, and as idle for both 3GPP access and non-3GPP access, when the UE has registered to a 5GC of the same PLMN for both 3GPP access and non-3GPP access.

Step 2) The UE transitions to the connected mode through one access and transmits a NAS message to the AMF.

Step 2-1) When the access is 3GPP access, an NG-RAN may perform one or more of the following operations.

Step 2-1-1) Upon receipt of a 5G-GUTI and the NAS messages from the UE, the NG-RAN determines the serving AMF of the UE based on the 5G-GUTI. However, when determining that the AMF is unavailable, the NG-RAN should select a new AMF and inform the UE that a new AMF should be selected.

Step 2-1-2) When the UE transmits an RRC Connection Request message to the NG-RAN, the NF-RAN determines the serving AMF of the UE based on a temporary ID (5G-GUTI or <5G-S-TMSI>: =<AMF Set ID> <AMF Pointer> <(5G-TMSF>) of the UE included in the RRC Connection Request message. However, when determining that this AMF is unavailable, the NG-RAN should select a new AMF, and informs the UE of this. Thus, related information may be included in an RRC Connection Setup message transmitted to the UE. For reference, the RRC Connection Request message may be regarded as a message without a NAS message, which the UE first transmits to the NG-RAN in order to transition to the connected mode. When the NG-RAN is an ng-eNB, the message may be an RRC Connection Request message, and when the NG-RAN is a gNB, the message may be an RRC Setup Request message.

Steps 2-1-1) and 2-1-2) are intended to enable the UE to perform one or more of the operations a) to d) described in the third embodiment. Accordingly, information indicated to the UE may be interpreted as serving this purpose and may be explicit or implicit.

Step 2-2) When the access is non-3GPP access, an N3IWF may perform one or more of the following operations.

Step 2-2-1) Upon receipt of the 5G-GUTI and the NAS messages from the UE, the N3IWF determines the serving AMF of the UE based on the 5G-GUTI. However, when determining that this AMF is unavailable, the N3IWF should select a new AMF and inform the UE that a new AMF should be selected.

Step 2-2-2) When the UE transmits an IKE message (e.g., IKE_AUTH_Req) to the N3IWF, the N3IWF determines the serving AMF of the UE based on a temporary ID (5G-GUTI또는 <5G-S-TMSI>:=<AMF Set ID> <AMF Pointer> <5G-TMSI>) of the UE included in the IKE message. However, when determining that this AMF is unavailable, the N3IWF should select a new AMF, and informs the UE of this. Thus, related information may be included in an IKE message (e.g., IKE_AUTH_Res) transmitted to the UE. For reference, the IKE message may be regarded as a message without a NAS message, which the UE first transmits to the N3IWF.

Steps 2-2-1) and 2-2-2) are intended to enable the UE to perform one or more of the operations a) to d) described in the third embodiment. Accordingly, information indicated to the UE may be interpreted as serving this purpose and may be explicit or implicit.

Step 3) The NG-RAN or the N3IWF selects a new AMF for the UE and transmits the NAS message to this AMF. Then, the AMF receives the NAS message and performs a related procedure.

Embodiment 5

The fifth embodiment of the present disclosure centers on operations of a serving AMF (unavailable AMF) of a UE and a new serving AMF of the UE.

When the AMF determines that it becomes unavailable and thus is not capable of serving the UE any longer, this AMF (referred to as old. AMF) performs the following operation before notifying a 5G-AN and other CP functions that the old AMF is not available.

Step 1) The old AMF searches for any UE which has registered through both 3GPP access and non-3GPP access among UEs served by the old AMF. In the presence of such a UE, the old AMF checks whether the UE is idle for both accesses. The search and check may be performed in a single operation.

Step 2) In the presence of such a UE as described above, a new AMF is selected for this UE.

Step 3) The old AMF transmits a UE context of the UE to the selected AMF. Herein, the old AMF may explicitly or implicitly request the new AMF to allocate and provide a 5G-GUTI to the UE. Upon receipt of the UE context, the new AMF may recognize that a 5G-GUTI should be allocated to the UE, or may recognize based on the received UE context that the UE is registered for both accesses and idle for both accesses and thus a 5G-GUTI should be allocated to the UE.

Instead of performing step 3) only for a UE satisfying the condition of step 1) as in step 1) and step 2), the old AMF may select a new AMF for all the UEs that it has served and perform step 3) or may select a new AMF for an idle UE registered for one access, and perform step 3). The selected AMF may be different AMF for each UE (e.g., one of AMFs belonging to the same AMF set). Upon receipt of the UE context from the old AMF, the new AMF may recognize the explicit or implicit 5G-GUTI allocation request and determine that a 5G-GUTI should be allocated to the UE. The new AMF may transmit a response such as ack to the old AMF after receiving the UE context.

Step 4) The new AMF allocates and provides a 5G-GUTI to the UE. For this purpose, a legacy procedure, for example, the UE Configuration Update procedure described in section 4.2.4.2 of TS 23.502, or a newly defined procedure may be used. The 5G-GUTI may be provided through 3GPP access by which the idle UE may be paged.

The new AMF may transmit, to the old AMF, a message indicating that the 5G-GUTI has been allocated/provided to the UE. The old AMF may perform an operation of notifying the 5G-AN and other CP functions that the old AMF is unavailable after step 3) or step 4).

In the above description, for the 5G-GUTI, section 5.9.4 of TS 23.501 may be referred to, and the 5G-GUTI may include an ID of the AMF which has allocated the 5G-GUTI. Upon receipt of a NAS message together with the 5G-GUTI (interpreted as a 5G-S-TMSI or GUAMI information or AMF ID information in the present disclosure), the 5G-AN (interpreted as NG-RAN in the case of 3GPP access and N3IWF in the case of non-3GPP access) may determine the serving AMF of the UE and transmit the NAS message to the AMF.

Figure 9:
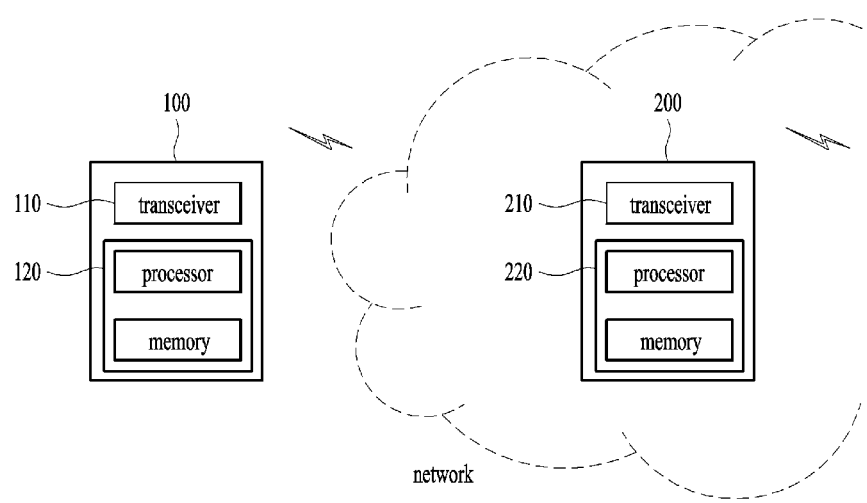
FIG. 9 is a block diagram of a node device according to an embodiment of the present disclosure.

FIG. 9 is a block diagram illustrating a preferred embodiment of a UE and a network node according to an example of the present disclosure.

Referring to FIG. 9, a network device 200 according to the present disclosure may include a transceiver 210 and a device 220 for a wireless communication system. The device 220 for the wireless communication system may include a memory and at least one processor coupled to the memory. The transceiver 210 may be configured to transmit various signals, data, and information to an external device and receive various signals, data, and information from the external device. The network device 200 may be connected to the external device wiredly and/or wirelessly. The at least one processor may provide overall control to the network device 200 and may be configured to compute and process information transmitted to and received from the external device. The memory may store the computed and processed information for a specific time, and may be replaced with a component such as a buffer (not shown). Further, the processor may be configured to perform a network node operation proposed in the present disclosure.

Specifically, the at least one processor may receive a Deregistration Request message from a UE and transmit a Deregistration Accept message to the UE in response to the Deregistration Request message. The Deregistration Accept message may include a first 5G-GUTI allocated by the device and the related foregoing descriptions may be processed.

Referring to FIG. 9, a UE DEVICE 100 according to the present disclosure may include a transceiver 110 and a device 120 for a wireless communication system. The device 120 for the wireless communication system may include a memory and at least one processor coupled to the memory. The transceiver 110 may be configured to transmit various signals, data, and information to an external device and receive various signals, data, and information from the external device. The UE DEVICE 100 may be connected to the external device wiredly and/or wirelessly. The at least one processor may provide overall control to the UE DEVICE 100 and may be configured to compute and process information transmitted to and received from the external device. The memory may store the computed and processed information for a specific time, and may be replaced with a component such as a buffer (not shown). Further, the processor may be configured to perform a UE operation proposed in the present disclosure.

Specifically, the at least one processor may transmit a Deregistration Request message to a second AMF and receive a Deregistration Accept message from a first AMF in response to the Deregistration Request message. The Deregistration Accept message may include a first 5G-GUTI allocated by the first AMF and the related foregoing descriptions may be processed.

The present disclosure may be a non-transitory computer-readable medium storing computer executable code for wireless communications. The computer executable code may include code that includes receiving a Deregistration Request message from a UE by a first AMF and transmitting a Deregistration Accept message to the UE in response to the Deregistration Request message by the first AMF, wherein the Deregistration Accept message includes a first 5G-GUTI allocated by the first AMF.

The computer executable code may further include a code that includes transmitting a Deregistration Request message to a second AMF and receiving a Deregistration Accept message to the UE in response to the Deregistration Request message from a first AMF, wherein the Deregistration Accept message includes a first 5G-GUTI allocated by the first AMF.

Regarding the configurations of the UE device 100 and the network device 200, the above-described various embodiments of the present disclosure may be applied independently, or two or more embodiments of the present disclosure may be applied at the same time. Redundant description has been omitted for clarity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While various embodiments of the present disclosure have been described in the context of a 3GPP system, the embodiments are applicable in the same manner to various mobile communication systems.

The invention claimed is:

1. A method performed by a first access and mobility management function (AMF) in a wireless communication system, the method comprising:
   receiving, from a user equipment (UE), a deregistration request message, after a second AMF becomes unavailable while the second AMF is a serving AMF for the UE; and
   transmitting, to the UE, a deregistration accept message in response to the deregistration request message,
   wherein the deregistration accept message includes a first $5^{th}$ generation-globally unique temporary identifier (5G-GUTI) allocated by the first AMF, and
   wherein the deregistration request message includes a second 5G-GUTI allocated by the second AMF.

2. The method according to claim 1, wherein the second AMF becomes unavailable while the UE is in an idle state for both of a first access and a second access.

3. The method according to claim 2, wherein the deregistration request message includes information indicating for which access between the first access and the second access deregistration is.

4. The method according to claim 2, wherein the first 5G-GUTI is used for both of the first access and the second access.

5. The method according to claim 2, wherein the first access and the second access belong to the same public land mobile network (PLMN).

6. The method according to claim 1, wherein the first AMF is selected by a network node which has received the deregistration request message.

7. The method according to claim 6, wherein the network node is one of a next generation radio access network (NG-RAN) or a non-$3^{rd}$ generation partnership project (3GPP) interworking function (N3IWF).

8. The method according to claim 2, wherein the UE has registered to a $5^{th}$ generation core network (5GC) through the first access and the second access.

9. The method according to claim 2, wherein the first access is 3GPP access and the second access is non-3GPP access, or the first access is non-3GPP access and the second access is 3GPP access.

10. A first access and mobility management function (AMF) in a wireless communication system, the first AMF comprising:
    a transceiver; and
    at least one processor coupled to the transceiver and configured to:
    receive, from a user equipment (UE), a deregistration request message, after a second AMF becomes unavailable while the second AMF is a serving AMF for the UE, and
    transmit, to the UE, a deregistration accept message in response to the deregistration request message, and
    wherein the deregistration accept message includes a first $5^{th}$ generation-globally unique temporary identifier (5G-GUTI) allocated by the first AMF, and
    wherein the deregistration request message includes a second 5G-GUTI allocated by the second AMF.

11. A user equipment (UE) in a wireless communication system, the UE comprising:
    a transceiver; and
    at least one processor coupled to the transceiver and configured to:
    performing a registration procedure with a second access and mobility management function (AMF),
    transmit a deregistration request message a first AMF, after the second AMF becomes unavailable while the second AMF is a serving AMF for the UE, and
    receive, from the first AMF, a deregistration accept message, and
    wherein the deregistration accept message includes a first $5^{th}$ generation-globally unique temporary identifier (5G-GUTI) allocated by the first AMF, and
    wherein the deregistration request message includes a second 5G-GUTI allocated by the second AMF.

* * * * *